United States Patent
Yakushiji et al.

(10) Patent No.: US 8,767,350 B2
(45) Date of Patent: Jul. 1, 2014

(54) MAGNETIC RECORDING MEDIUM HAVING RECORDING REGIONS AND SEPARATING REGIONS AND METHODS OF MANUFACTURING THE SAME

(75) Inventors: Hiroshi Yakushiji, Yokohama (JP); Toshinori Ono, Tama (JP); Tatsuya Hinoue, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 617 days.

(21) Appl. No.: 12/961,430

(22) Filed: Dec. 6, 2010

(65) Prior Publication Data

US 2012/0140357 A1   Jun. 7, 2012

(51) Int. Cl.
G11B 5/82   (2006.01)
G11B 5/74   (2006.01)

(52) U.S. Cl.
CPC .................................. *G11B 5/746* (2013.01)
USPC ........................................................ 360/135

(58) Field of Classification Search
CPC ................................ G11B 5/743; G11B 5/746
USPC ........................................................ 360/135
See application file for complete search history.

(56) References Cited

U.S. PATENT DOCUMENTS

| | | | |
|---|---|---|---|
| 4,680,218 A | 7/1987 | Kimura et al. | |
| 4,898,774 A | 2/1990 | Yamashita et al. | |
| 5,462,784 A | 10/1995 | Grill et al. | |
| 5,942,317 A | 8/1999 | White | |
| 6,583,957 B1 * | 6/2003 | Takeshita et al. | 360/135 |
| 6,815,054 B1 | 11/2004 | Liu et al. | |
| 6,967,798 B2 * | 11/2005 | Homola et al. | 360/48 |
| 7,051,347 B2 * | 5/2006 | Tomiyama et al. | 720/718 |

(Continued)

FOREIGN PATENT DOCUMENTS

| | | |
|---|---|---|
| EP | 0 248 556 B1 | 1/1992 |
| JP | 61278025 A2 | 12/1986 |

(Continued)

OTHER PUBLICATIONS

Pirzada et al., "Functionalized Ion-Beam Carbon for Magnetic Disks," IEEE Transactions on Magnetics. vol. 38, No. 5, Sep. 2002, p. 2117-2119, abstract only.

(Continued)

*Primary Examiner* — David D Davis
(74) *Attorney, Agent, or Firm* — Zilka-Kotab, PC

(57) ABSTRACT

In one embodiment, a method for forming a magnetic recording medium includes forming a protective layer above recording regions of a patterned magnetic recording layer and separating regions between the recording regions, wherein the protective layer forms on sides of the recording regions and partially fills the separating regions, and forming a filler layer on the protective layer, wherein the filler layer completely fills the separating regions, wherein the filler layer has an uneven upper surface. In another embodiment, a medium includes a patterned magnetic recording layer, a protective layer above the patterned magnetic recording layer and on sides of the patterned magnetic recording layer, and a filler layer positioned between the patterned magnetic recording layer in separating regions, wherein DLC of the filler layer is a lower density than DLC of the protective layer. Other systems and methods are described according to more embodiments.

21 Claims, 16 Drawing Sheets

(56) References Cited

U.S. PATENT DOCUMENTS

| | | |
|---|---|---|
| 7,438,982 B2 | 10/2008 | Suwa et al. |
| 7,572,528 B2 * | 8/2009 | Yamamoto et al. ......... 428/833.2 |
| 2006/0063042 A1 * | 3/2006 | Takai et al. ................ 428/848.2 |
| 2006/0172154 A1 * | 8/2006 | Suwa et al. ................... 428/836 |
| 2006/0183004 A1 * | 8/2006 | Hattori et al. .............. 428/833.1 |
| 2007/0195459 A1 * | 8/2007 | Suwa et al. ................... 360/135 |
| 2008/0144218 A1 | 6/2008 | Iwasaki |
| 2009/0208778 A1 | 8/2009 | Horiguchi |
| 2010/0059476 A1 | 3/2010 | Yamamoto et al. |
| 2010/0128378 A1 | 5/2010 | Fukushima et al. |
| 2010/0147791 A1 | 6/2010 | Isowaki et al. |

FOREIGN PATENT DOCUMENTS

| | | |
|---|---|---|
| JP | 02208819 A2 | 8/1990 |
| JP | 05266465 A2 | 10/1993 |
| JP | 2003109210 A | 4/2003 |
| JP | 2007272948 A | 10/2007 |

OTHER PUBLICATIONS

Chinmeteepitak, Katesudar, "Effect of H Content in the Carbon Overcoat on the Corrosion Resistance of Thin Film Magnetic Disks," A Thesis Presented to the Faculty of The Department of Materials Engineering, San Jose State University, May 1996, p. 1-87.

* cited by examiner

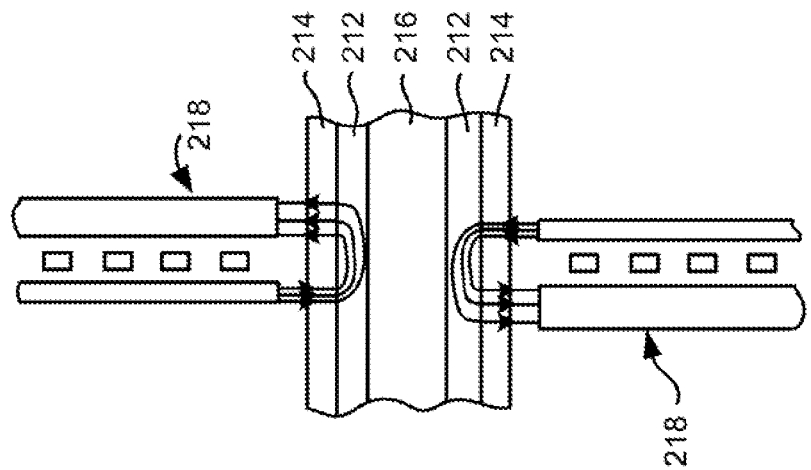
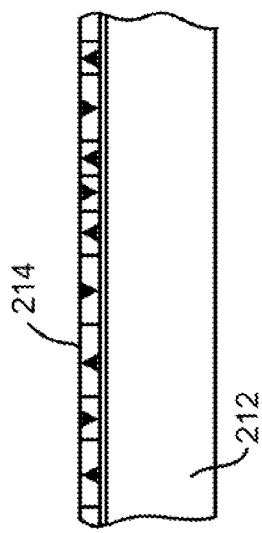
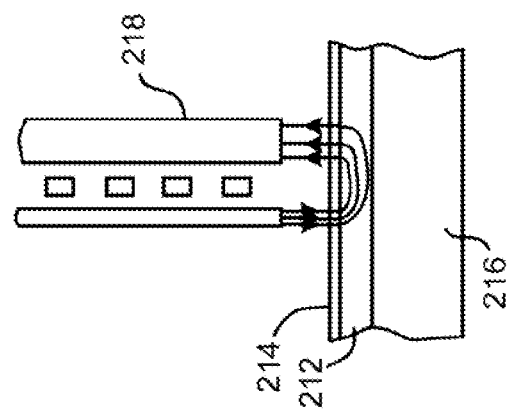
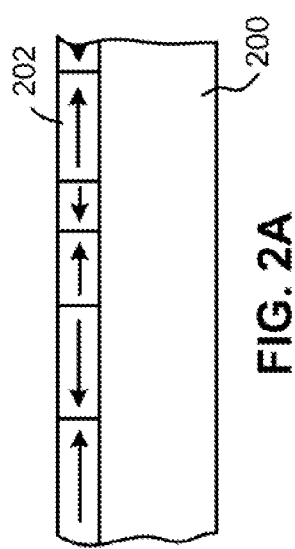
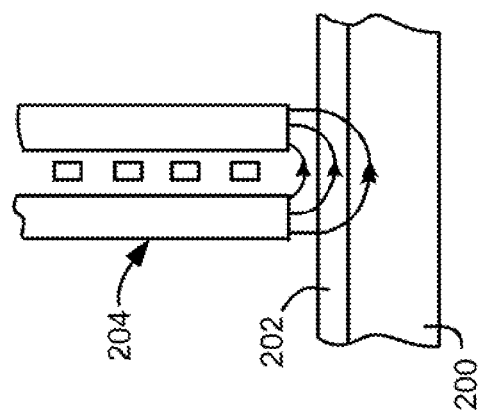

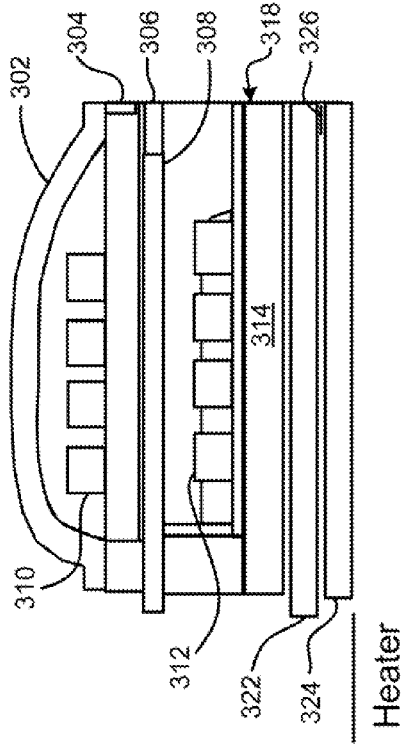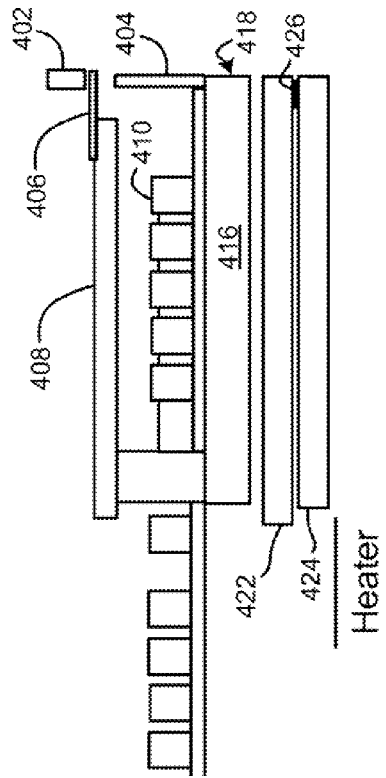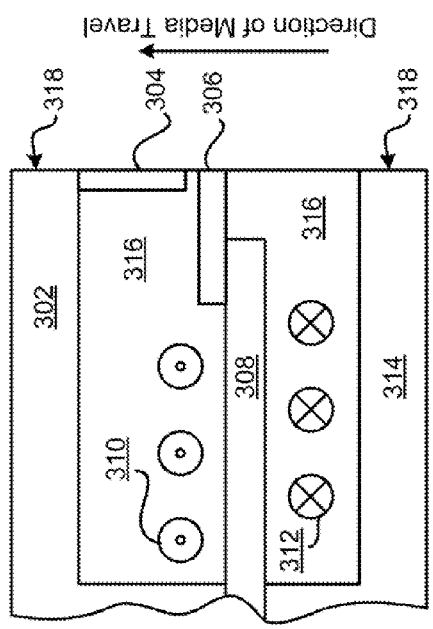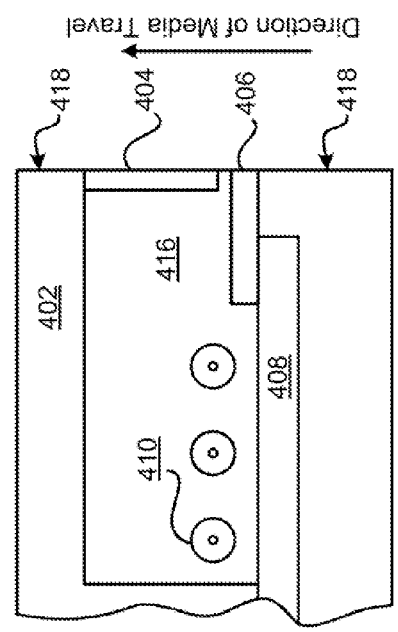

MAGNETIC RECORDING MEDIUM HAVING RECORDING REGIONS AND SEPARATING REGIONS AND METHODS OF MANUFACTURING THE SAME

FIELD OF THE INVENTION

The present invention relates to patterned discrete track media and bit patterned media capable of high recording density and methods for producing the same.

BACKGROUND OF THE INVENTION

The heart of a computer is a magnetic hard disk drive (HDD) which typically includes a rotating magnetic disk, a slider that has read and write heads, a suspension arm above the rotating disk, and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions. The volume of information processing in the information age is increasing rapidly. In particular, there is a desire for HDDs to store more information in its limited area and volume. A technical approach to meet this desire is to increase the capacity by increasing the recording density of the HDD. To achieve higher recording density, further miniaturization of recording bits is effective, which in turn typically requires the design of smaller and smaller components.

Increased density is essential for increasing the capacity of magnetic disk devices and making these devices more compact. The recording density of a magnetic disk depends, among other things, on magnetic film characteristics of the magnetic recording medium (coercive force, film thickness, etc.), magnetic head characteristics (frequency characteristics, gap length, etc.), and spacing between the magnetic film of the magnetic recording medium and the magnetic head (referred to below as the "magnetic spacing").

One method of increasing the recording density of a magnetic disk involves a decrease in the medium noise caused by reducing the magnetization inversion of the magnetic recording medium. Conventional magnetic recording media employ a structure in which the ferromagnetic crystal grains which form the magnetic layer are separated by a non-magnetic material which is already contained in the recording layer.

Magnetic recording media have been proposed in which the magnetic recording density is increased by controlling these separating regions more actively. Research and development are currently focused on discrete track media in which processing is carried out in order to provide separation between recording tracks, and also bit patterned media in which processing is carried out in order to provide separation between recording bits. In both cases, the technology for forming separating regions is one factor in increasing the density. For discrete track media, for example, a type of magnetic film processing has been proposed as a technology for forming separating regions, in which recording regions and separating regions are produced on the recording layer by masking the recording layer and etching the regions to be separated. The space between the magnetic recording medium and the magnetic head (referred to below as the "flying height") has been reduced to around 10 nm, and with this kind of discrete track medium the planarity of the surface is a factor in achieving favorable recording and reproduction characteristics by stabilizing the flying height of the magnetic head. It is therefore preferable for the separating regions to be filled with a non-magnetic material, and for any excess filler present on the recording regions to be removed in order to planarize the top surface of the recording regions and separating regions. Diamond-like carbon (DLC) is preferably used as a filler, according to disclosures in Japanese Unexamined Patent Application Publication No. 2003-109210, for example. It should be noted that DLC is also used as an overcoat for may magnetic recording media. Chemical vapor deposition (CVD) employing hydrocarbon gas may be used with DLC. Furthermore, one method for removing excess filler in order to planarize the surface involves a dry process such as ion beam etching (IBE) or reactive ion beam etching, or a wet process such as chemical mechanical polishing (CMP). It should be noted that with wet processes, such as CMP, residual microparticles often have an adverse effect on the ability of the magnetic head to float above the medium and the electromagnetic conversion characteristics, and therefore dry processes are often selected. For example, Japanese Unexamined Patent Application Publication No. 2007-272948 discloses a method in which separating regions are filled with amorphous carbon formed by sputtering using a graphite target and the surface is then planarized by etching, after which a DLC protective layer is formed by chemical vapor deposition (CVD).

DLC is used as an overcoat for magnetic recording media according to the examples above. Additionally, the magnetic spacing is reduced in order to increase the density, and high hardness and high density DLC is formed to around several nm in order to meet corrosion resistance and durability product performance parameters. If the hydrogen content of the DLC is low and the sp3 ratio is high, it tends to exhibit properties of high strength at high density. However, the filler for the separating regions formed more thickly than the regions need for an overcoat, and therefore problems arise, such as peeling, when the separating regions are filled with DLC which has a low hydrogen content. Furthermore, a DLC film is grown in accordance with the pattern of the recording layer, and therefore there is a large difference in level after the separating regions have been filled. Furthermore, even if the excess filler is removed in a dry process in which mechanical polishing is carried out, like in CMP, the surface cannot be adequately planarized.

As a result, there are problems in that the magnetic head does not fly stably during operation. It should be noted that the difference in level in the unevenness on the surface tends to decrease as the film of filler which is formed becomes thicker, and it is possible to keep the difference in level in the unevenness down to a small size after the separating regions have been filled by forming the filler thickly. However, if the filler is formed thickly, more time is needed for the process of filling the separating regions and for the process of removing the excess filler, which reduces production efficiency.

Furthermore, not enough consideration has been given to sliding reliability in conventional magnetic recording media, with regard to reducing the flying height of the magnetic head, something which is useful to increase the recording density of the media. That is to say, contact between the magnetic head and the magnetic recording medium which occurs as the flying height of the magnetic head is reduced may cause damage such that the data recorded on the magnetic recording medium cannot be read: this is referred to as "crash." For this reason, the DLC overcoat surface of the magnetic recording medium is coated with a lubricant, which reduces the shear force of the magnetic head, in order to reduce wear of the magnetic head and the magnetic recording medium, in such a way that crash does not occur even if the two come into contact. However, the magnetic recording medium rotates at a high speed of at least 5400 rpm, for example, and therefore a phenomenon occurs whereby as the lubricant is scattered (lubricant film thickness becomes thinner than that of initial lubricant film thickness), the capacity for reducing the shear force is reduced, and the wear resistance deteriorates. According to recent practice, a lubricant having polar groups at the terminals is often applied in order to provide a reasonable trade off between wear resistance and a reduction in scattering of the lubricant caused by the rotation of the magnetic recording medium. However, even though lubricants having polar groups are not scattered, they have high affinity to the DLC overcoat, and therefore there is a decrease in their ability to reduce the shear force when there is contact with the magnetic head. Considering the contact between the magnetic recording medium and the magnetic head which accompanies the reduction in the flying height of the magnetic head, there are problems in terms of compatibility between the capacity to reduce the shear force and reducing the tendency of the lubricant to scatter.

Japanese Unexamined Patent Application Publication No. 2007-272948 discloses a patterned medium in which separating regions are filled with amorphous carbon and a DLC overcoat is formed on a magnetic film by CVD, but the following problems arise with the methods of formation. Firstly, when the separating regions are filled with amorphous carbon using sputtering and the pattern pitch is made finer in order to increase the density, there is a strong possibility that voids will form within the separating regions during the sputtering which provides poor coverage of the difference in level, and corrosion will most likely occur over time. Secondly, not enough consideration has been given to sliding reliability in the magnetic recording media, with regard to reducing the flying height of the magnetic head, something which is useful to increase the density.

Accordingly, a method of producing a magnetic recording medium which provides high density recording while alleviating or eliminating the problems associated with prior attempts would be beneficial.

SUMMARY OF THE INVENTION

Accordingly, a method of producing a magnetic recording medium which provides high density recording while alleviating or eliminating the problems associated with prior attempts would be beneficial.

In one embodiment, a method for forming a magnetic recording medium includes forming a patterned magnetic recording layer, forming a protective layer above recording regions of the patterned magnetic recording layer and separating regions between the recording regions, wherein the protective layer forms on sides of the recording regions and partially fills the separating regions, and forms a filler layer on the protective layer, wherein the filler layer completely fills the separating regions, wherein the filler layer has an uneven upper surface.

In another embodiment, a magnetic recording medium includes a patterned magnetic recording layer, a protective layer above the patterned magnetic recording layer and on sides of the patterned magnetic recording layer, and a filler layer positioned between the patterned magnetic recording layer in separating regions, wherein the filler layer and the protective layer comprise diamond like carbon (DLC), wherein a density of DLC in the filler layer is lower than a density of DLC in the protective layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method for forming a magnetic recording medium includes forming a protective layer above recording regions of a patterned magnetic recording layer and separating regions between the recording regions, wherein the protective layer forms on sides of the recording regions and partially fills the separating regions, and forming a filler layer on the protective layer, wherein the filler layer completely fills the separating regions, wherein the filler layer has an uneven upper surface.

In another general embodiment, a magnetic recording medium includes a patterned magnetic recording layer, a protective layer above the patterned magnetic recording layer and on sides of the patterned magnetic recording layer, and a filler layer positioned between the patterned magnetic recording layer in separating regions, wherein the filler layer and the protective layer comprise diamond like carbon (DLC), wherein a density of DLC in the filler layer is lower than a density of DLC in the protective layer.

Figure 1:
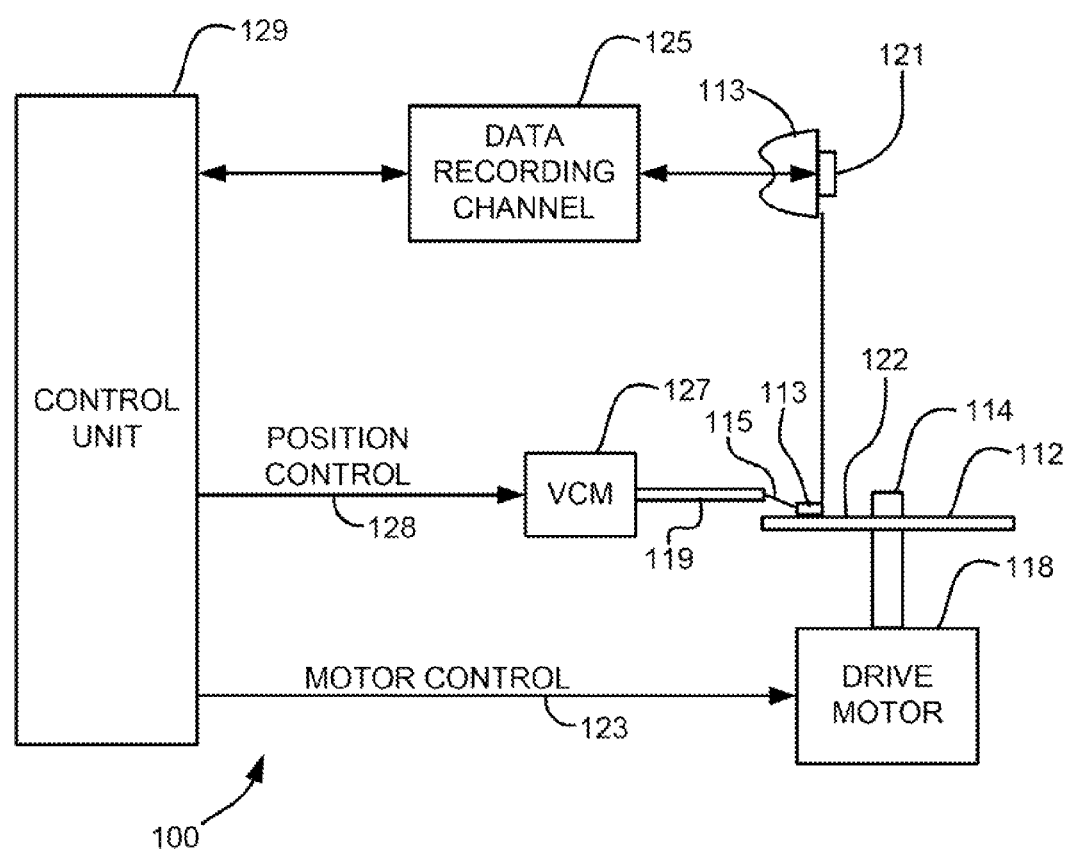
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 using a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

According to one embodiment, a magnetic recording medium is provided in which separating regions disposed between recording regions are filled with DLC, while the magnetic recording medium continues to have excellent magnetic head flying ability, corrosion resistance, and scratch resistance.

Figure 5:
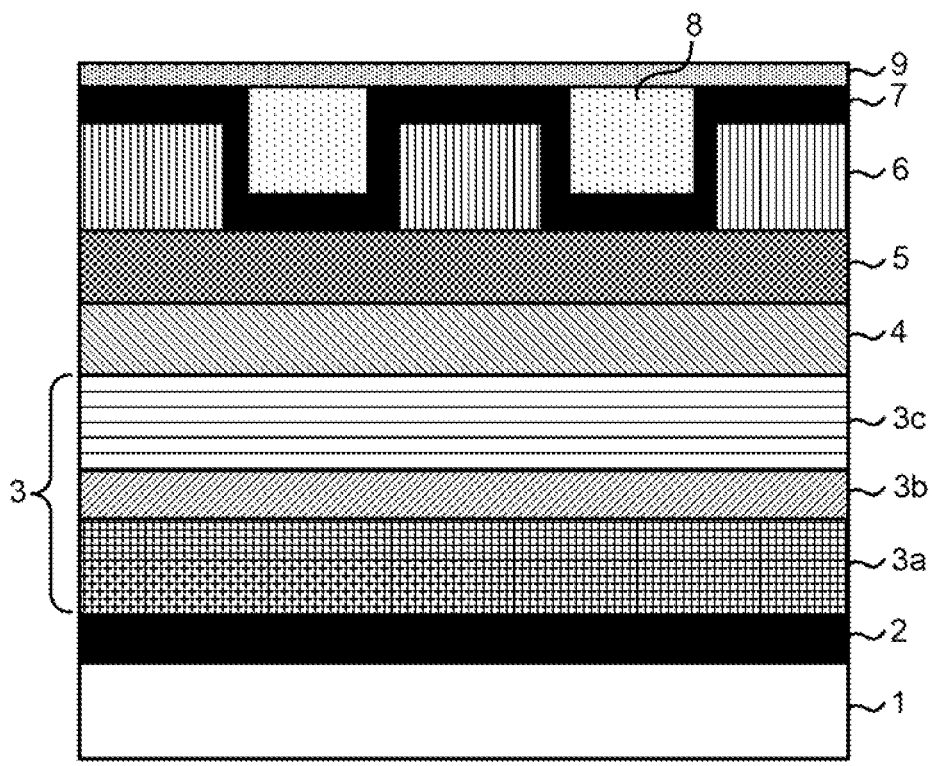
FIG. 5 is a cross-sectional schematic of a magnetic recording medium according to one embodiment.

With reference to FIG. 5, a magnetic recording medium is described according to one embodiment. The magnetic recording medium may be a discrete track medium in which an adhesion layer 2, soft magnetic layer 3, seed layer 4, interlayer 5, and magnetic recording layer 6 are formed in succession on a substrate 1, and the top surface of the recording regions are covered with a protective layer 7 comprising one or more layers. The uppermost surface layer of the protective layer 7 may be formed from DLC, tetrahedral amorphous carbon (ta-C), etc., and the separating regions may be formed with a DLC filler 8 which includes more hydrogen atoms than the carbon material which forms the uppermost surface layer of the protective layer 7. The surfaces of the recording regions and the separating regions have a structure in which the uppermost surface layer of the protective layer 7, which may be carbon containing relatively fewer hydrogen atoms, and the filler 8, which may be carbon containing relatively more hydrogen atoms, are present at intervals in the in-plane direction, and the top surface of the protective layer 7 and the filler 8 in the separating regions is coated with a lubricant layer 9 comprising a lubricant having polar groups.

Furthermore, the magnetic recording medium 10 may be a discrete track magnetic recording medium having a structure in which the recording tracks are separated in a concentric manner. However, this embodiment is not limiting on other embodiments of the present invention, as the magnetic recording medium may be a bit patterned medium in which all the recording bits are separated from one another.

According to some embodiments, the substrate 1 may be comprised of any material known in the art, such as, among other things, Al-alloy plated with NiP, borosilicate glass, aluminosilicate glass, etc., wherein the surface of the substrate 1 has been chemically-strengthened, in some approaches. The adhesion layer 2 may be comprised of any material known in the art, such as AlTi, NiTa, AlTa, CoTiAl, etc., this layer being provided, according to one embodiment, in order to improve the adhesion between the substrate and the soft magnetic layer 3. This layer may also be omitted if there is no particular need for it, in some approaches. The soft magnetic layer 3 may be comprised of any material known in the art, such as a laminate of Co-alloy, Fe-alloy, Fe—Co-alloy, Ru-alloy, etc. The seed layer 4 may be comprised of any material known in the art, such as NiW-alloy, NiFe-alloy, NiTa-alloy, TaTi-alloy, etc.

In more embodiments, the magnetic recording layer 6 may be comprised of any material known in the art, such as a CoCr-based alloy such as CoCrPt-alloy, an FePt-based alloy, a material in which ferromagnetic particles such as CoPt are included in the form of a matrix in an oxide-based material such as $SiO_2$, a laminate of these materials, etc. The protective layer 7 may be comprised of any material known in the art, such as a single layer of DLC, a single layer of ta-C, a laminate of DLC, ta-C, silicon nitride, and silicon carbide, wherein DLC and/or ta-C forms the uppermost surface layer of the structure, etc. The filler layer 8 may be comprised of any material known in the art, such as a single layer of DLC, a laminate of DLC, silicon nitride, silicon carbide, wherein DLC forms the uppermost surface layer of the structure, etc. It should be noted that the DLC which forms the protective layer 7 and the DLC which forms the filler layer 8 may be different, in some approaches. For example, the DLC which forms the filler layer 8 may include more hydrogen content than the DLC which forms the uppermost surface of the protective layer 7.

The lubricant layer 9 may be comprised of any material known in the art, such as a liquid lubricant having terminal polar groups. For example, perfluoropolyether (PFPE) may be used.

For example, in one embodiment, a magnetic recording medium may include a patterned magnetic recording layer, a protective layer above the patterned magnetic recording layer and on sides of the patterned magnetic recording layer, and a filler layer positioned between the patterned magnetic recording layer in separating regions. The filler layer and the protective layer may comprise diamond like carbon (DLC), and a density of DLC in the filler layer may be lower than a density of DLC in the protective layer.

In one approach, the filler layer and the protective layer may be planarized.

In another embodiment, the filler layer may have a characteristic of having been planarized while having a covering layer thereon, as described herein.

The magnetic recording medium may also include other layers, such as an adhesion layer, a lower soft magnetic layer above the adhesion layer, an antiferromagnetic coupling layer above the lower soft magnetic layer, an upper soft magnetic layer above the antiferromagnetic coupling layer, a seed layer above the upper soft magnetic layer, and an interlayer above the seed layer, wherein the patterned magnetic recording layer is above the interlayer.

In more approaches, magnetic recording medium may include a protective layer above the patterned magnetic recording layer, wherein an uppermost layer of the protective layer comprises carbon and hydrogen, and wherein the uppermost layer of the protective layer includes less hydrogen atoms per volume than the filler layer.

In any embodiment, the magnetic recording medium may be a bit patterned medium, a discrete track medium, or any other patterned recording medium, as is known in the art.

In further embodiments, the magnetic recording layer and the filler layer may be present in intervals at a surface of the magnetic recording medium.

In a preferred embodiment, a magnetic data storage system may include at least one magnetic head, a magnetic recording medium as described herein according to any of several embodiments, a drive mechanism for passing the magnetic medium over the at least one magnetic head, and a controller electrically coupled to the at least one magnetic head for controlling operation of the at least one magnetic head.

Figure 6A:
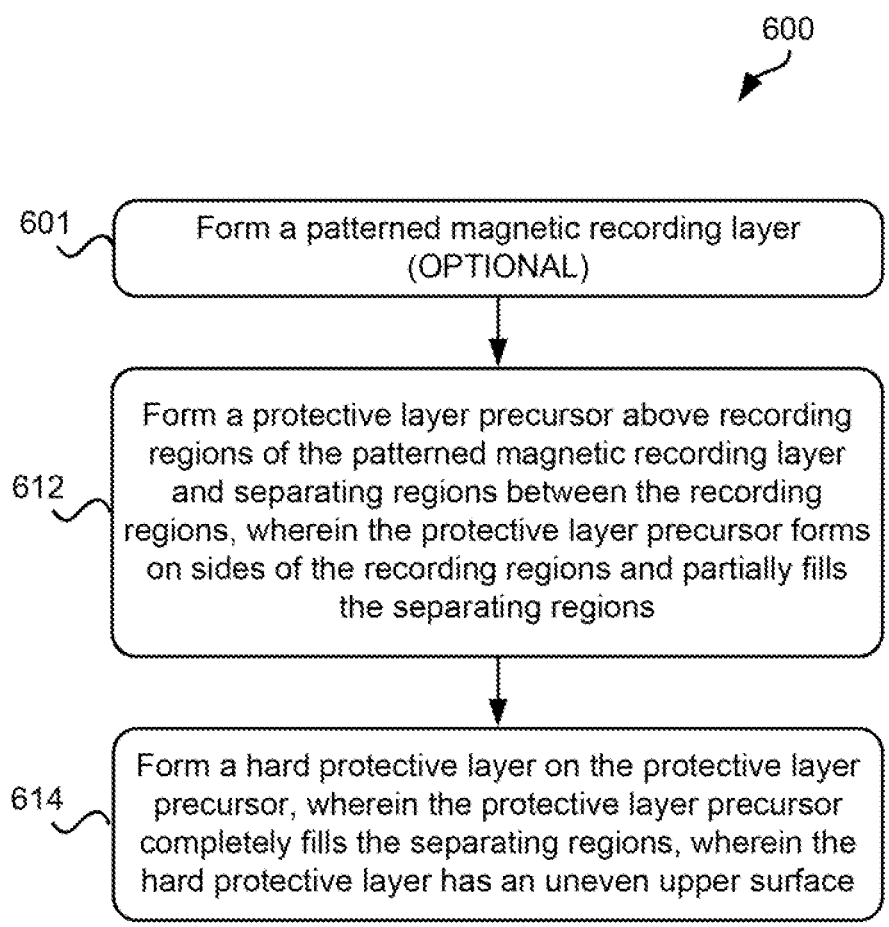
FIG. 6A is a flowchart showing a method for producing a magnetic recording medium according to one embodiment.

A method for producing a magnetic recording medium according to one embodiment is described below with reference to the flowchart shown in FIG. 6A. In FIG. 6A, several operations of a method 600 for producing a magnetic head are shown, according to one embodiment. The method 600 may be carried out in any desired environment, including those described in FIGS. 1-5, and 7-14, among others.

In optional operation 601, a patterned magnetic recording layer is formed via any method known in the art.

Figure 6B:
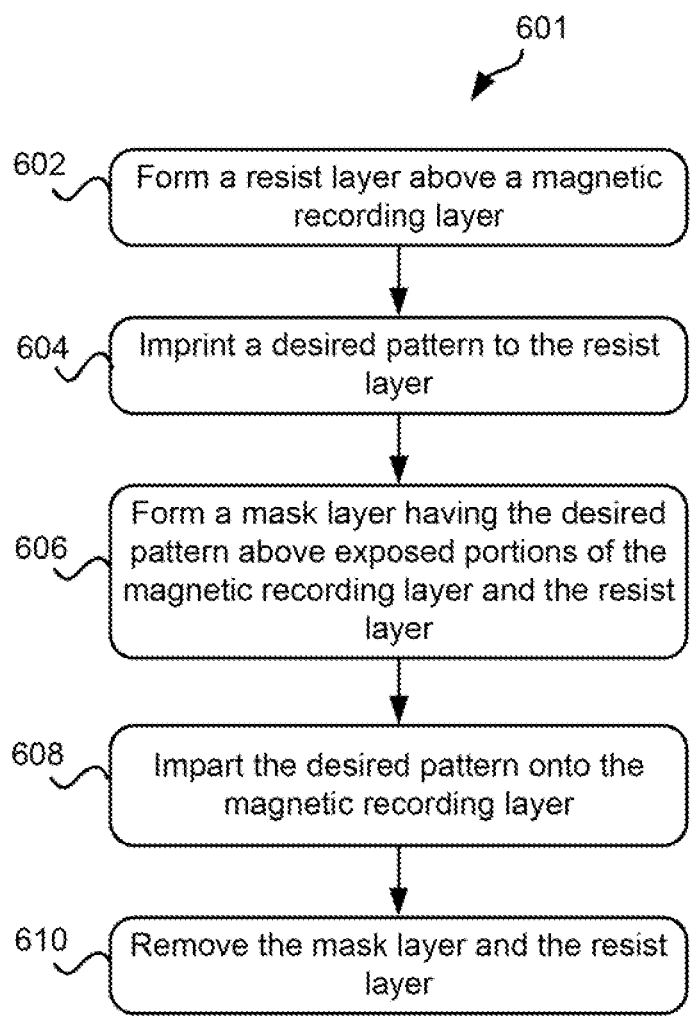
FIG. 6B is a flowchart showing a method for forming a patterned magnetic recording layer according to one embodiment.

For example, as shown in FIG. 6B, the optional operations described in operations 602-610 may be used, according to one embodiment. Of course, any other method may be used, such as forming the patterned medium through growth of separated regions, deposition of separate regions, etc. The patterned magnetic recording layer may comprise bit patterned media or discrete track media, according to several embodiments.

In optional operation 602, a resist layer is formed above a magnetic recording layer (which may or may not already be patterned) through any method known in the art, such as deposition, plating, etc.

In optional operation 604, a desired pattern is imprinted to the resist layer, as previously described, according to one embodiment.

In optional operation 606, a mask layer having the desired pattern is formed above exposed portions of the magnetic recording layer and the resist layer, as known in the art.

In optional operation 608, the desired pattern is imprinted onto the magnetic recording layer, though any method known in the art.

In optional operation 610, the mask layer and the resist layer are removed through any method known in the art.

Referring again to FIG. 6A, in operation 612, a protective layer is formed above recording regions of the patterned magnetic recording layer and separating regions between the recording regions, wherein the protective layer forms on sides of the recording regions and partially fills the separating regions, through any method known in the art.

In operation 614, a filler layer is formed on the protective layer, wherein the filler layer completely fills the separating regions, wherein the filler layer has an uneven upper surface, through any method known in the art.

Any of the above described embodiments and/or approaches, or those described regarding FIGS. 7-14 may be implemented in method 600 as well, in various embodiments.

FIGS. 7-14 are simplified cross-sectional views showing a method for producing a magnetic recording medium, according to various embodiments.

Figure 7:
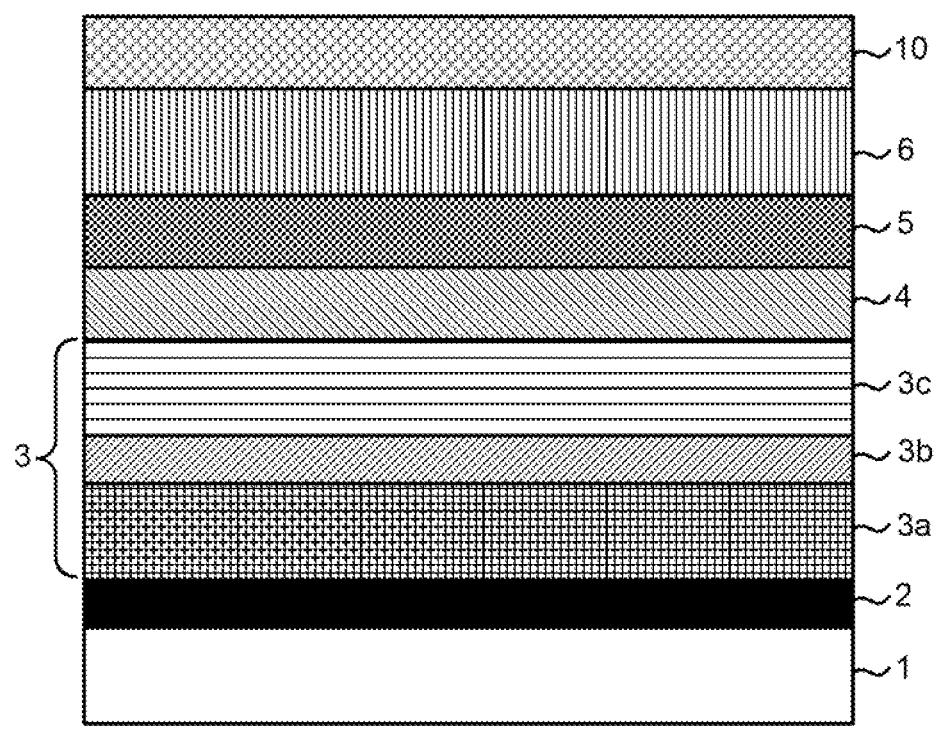
FIG. 7 is a cross-sectional schematic showing a starting material production step in the process for producing a magnetic recording medium according to one embodiment.

As shown in FIG. 7, the adhesion layer 2, a lower soft magnetic layer 3a, an Ru alloy antiferromagnetic coupling layer 3b, an upper soft magnetic layer 3c, the seed layer 4, the interlayer 5, the magnetic recording layer 6, and a mask layer precursor 10 may be formed in succession on the substrate 1. Sputtering may be used to form each of the above layers, or any other method known in the art.

Figure 8:
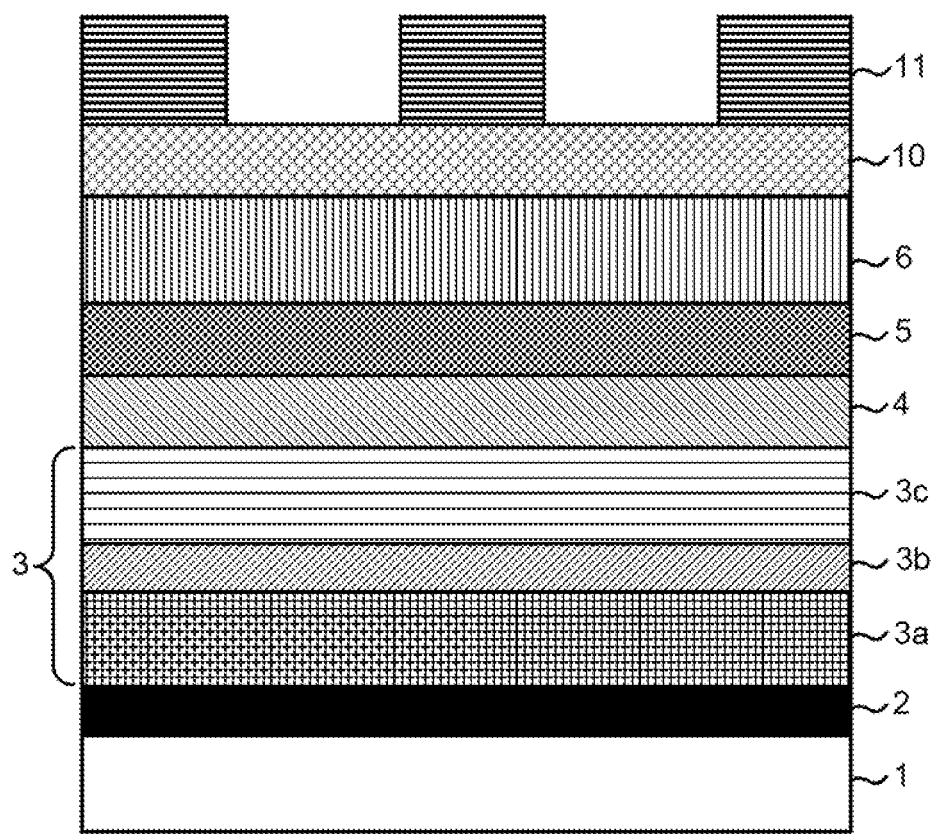
FIG. 8 is a cross-sectional schematic showing the organic resist layer having an uneven pattern being formed in the process for producing a magnetic recording medium according to one embodiment.

As shown in then applied FIG. 8, an organic resist layer 11 may then be applied to the medium which has undergone the above process, after which the desired pattern is formed by a method known in the art, such as imprinting. Spin coating, dip coating, etc., may be used for the organic resist layer 11. For the imprinting it is possible to use optical imprinting employing ultraviolet rays, etc., thermal imprinting, or the like.

A mask layer having the desired pattern may then be formed on the patterned medium via reactive ion etching (RIE), ion beam etching (IBE), etc. A metal or Si may be used for the material of the mask layer.

Figure 9:
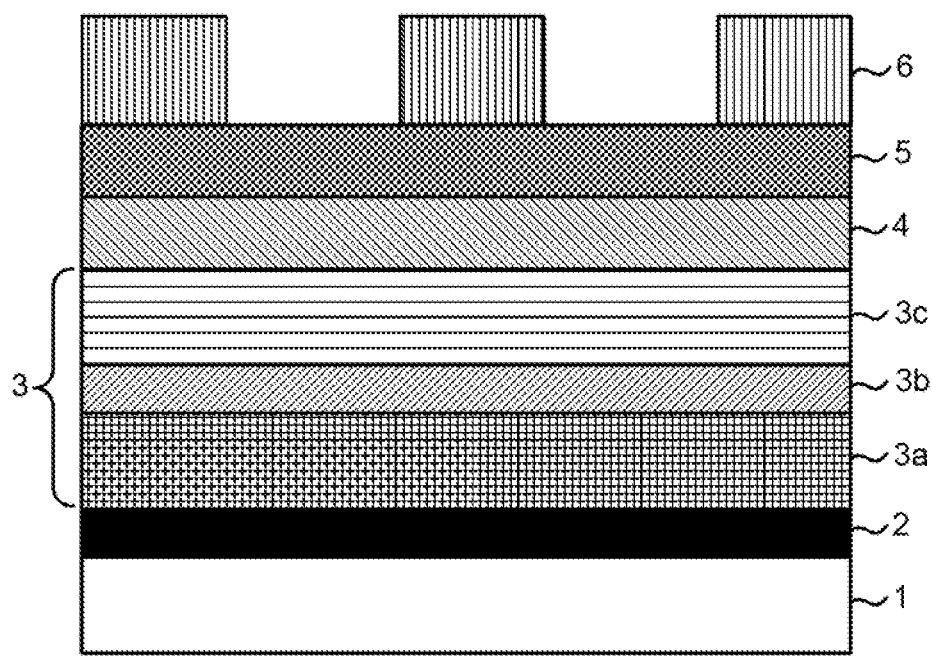
FIG. 9 is a cross-sectional schematic showing an uneven pattern being formed on a magnetic recording layer, according to one embodiment.

As shown in FIG. 9, the magnetic recording layer 6 may then be etched, via RIE, IBE, etc., and the desired pattern is formed, after which the mask layer is completely removed via RIE, IBE, etc.

Figure 10:
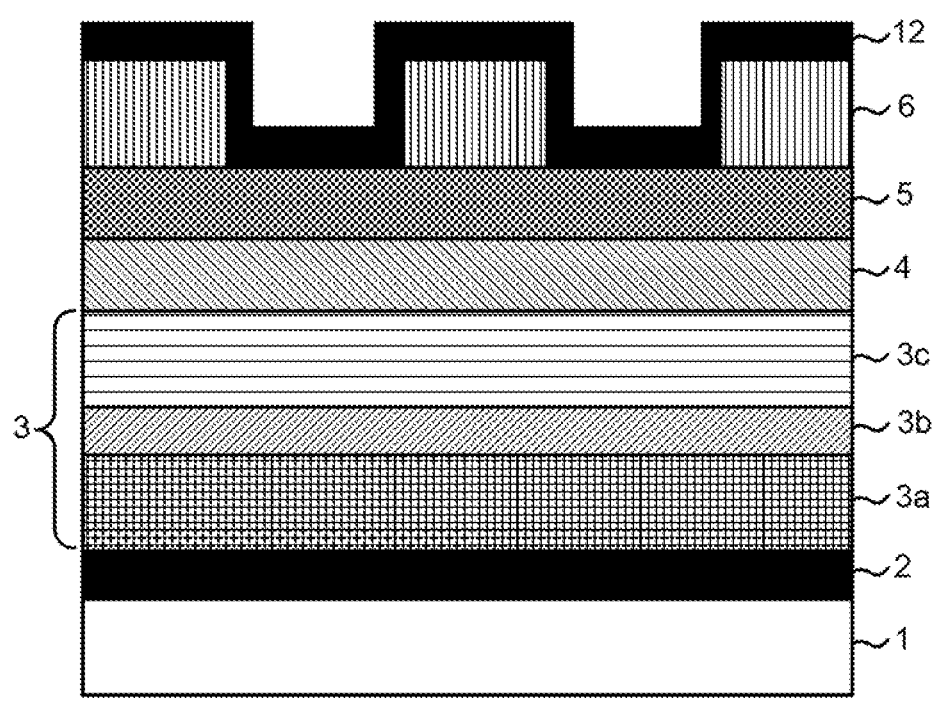
FIG. 10 is a cross-sectional schematic showing a protective layer being formed on the recording regions of a magnetic recording medium, according to one embodiment.

As shown in FIG. 10, a protective layer 12 may then be formed on the medium which has undergone the above process, using sputtering, CVD, vacuum arc deposition, etc. In this process, the protective layer 12 may be formed following the pattern on the magnetic recording layer 6. In this way, the protective layer 12 is also formed on the side and bottom surfaces of the separating regions, and the separating regions are partially filled. When DLC or other suitable material is formed by CVD, it is possible to use, as the starting material gas, a hydrocarbon gas such as methane, ethane, ethylene, acetylene, etc., the above gases being mixed with hydrogen gas or nitrogen gas, or with a mixed gas comprising hydrogen gas and nitrogen gas.

Figure 11:
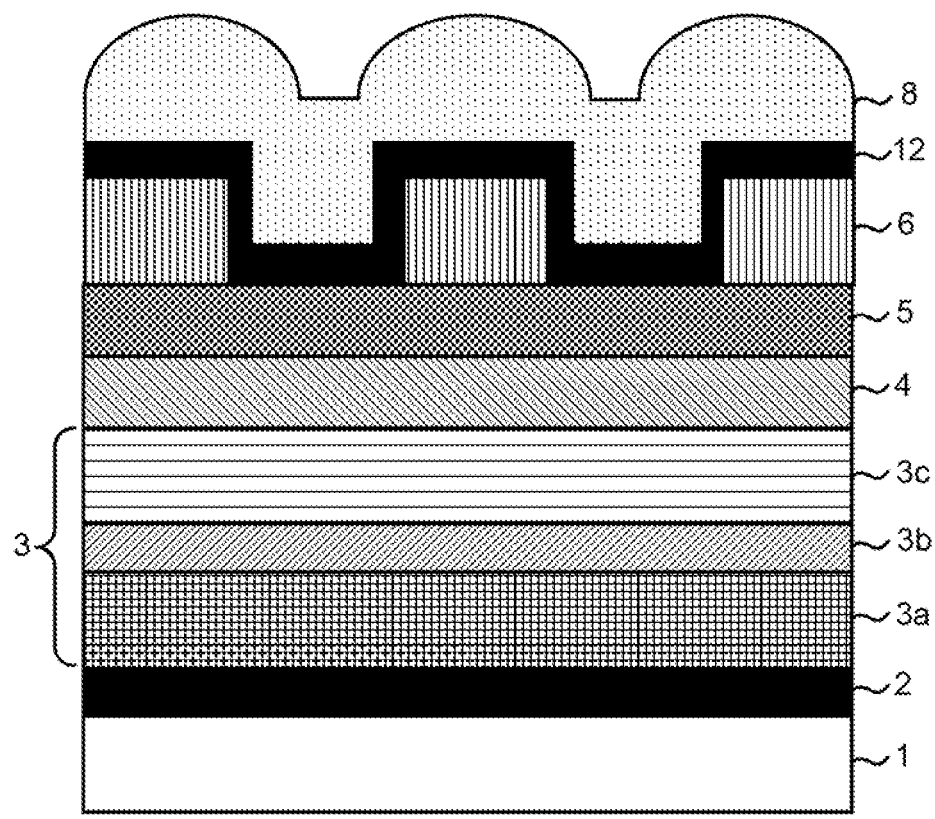
FIG. 11 is a cross-sectional schematic showing a filler layer being formed on a protective layer of a magnetic recording medium, according to one embodiment.

As shown in FIG. 11, the DLC filler layer 8 may then be formed on the protective layer 12 by CVD or some other process, and the separating regions are completely filled. It should be noted that the DLC which forms the filler layer 8 may include more hydrogen than the DLC which forms the protective layer 12. It is possible to use the same gas as described above for the starting material gas. The DLC forms a film following the pattern on the magnetic recording layer 6, and therefore there is a large difference in level after the separating regions have been filled. When there is such a large difference in level after the separating regions have been filled, it may not be possible to planarize the surface using a dry process, even if the excess filler on the top surface of the magnetic recording layer is removed.

Figure 12:
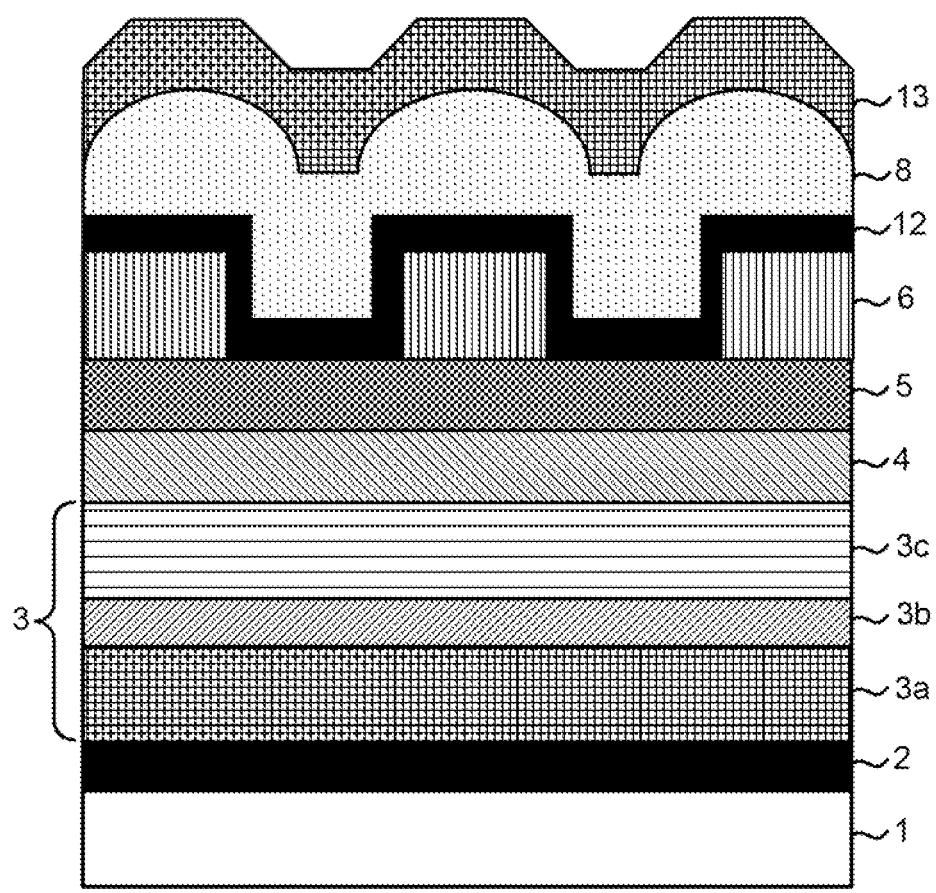
FIG. 12 is a cross-sectional schematic showing a covering layer being formed on a filler layer of a magnetic recording medium, according to one embodiment.

As shown in FIG. 12, a covering layer 13 may then be formed on the filler layer 8 by sputtering employing a substrate bias. A non-magnetic alloy containing Ti may be used as the material of the covering layer 13, or some other material. When the non-magnetic alloy layer containing Ti (covering layer 13) is formed on the uneven pattern via sputtering employing a substrate bias or some other method, the difference in level of the uneven pattern on the covering layer 13 can be reduced in size compared to the original difference in level of the uneven pattern on the filler layer 8. Forming this kind of covering layer 13 on the filler layer 8 makes it possible to reduce the size of the difference in level after the separating regions have been filled, and the surface can easily be planarized by way of a dry process.

Figure 13:
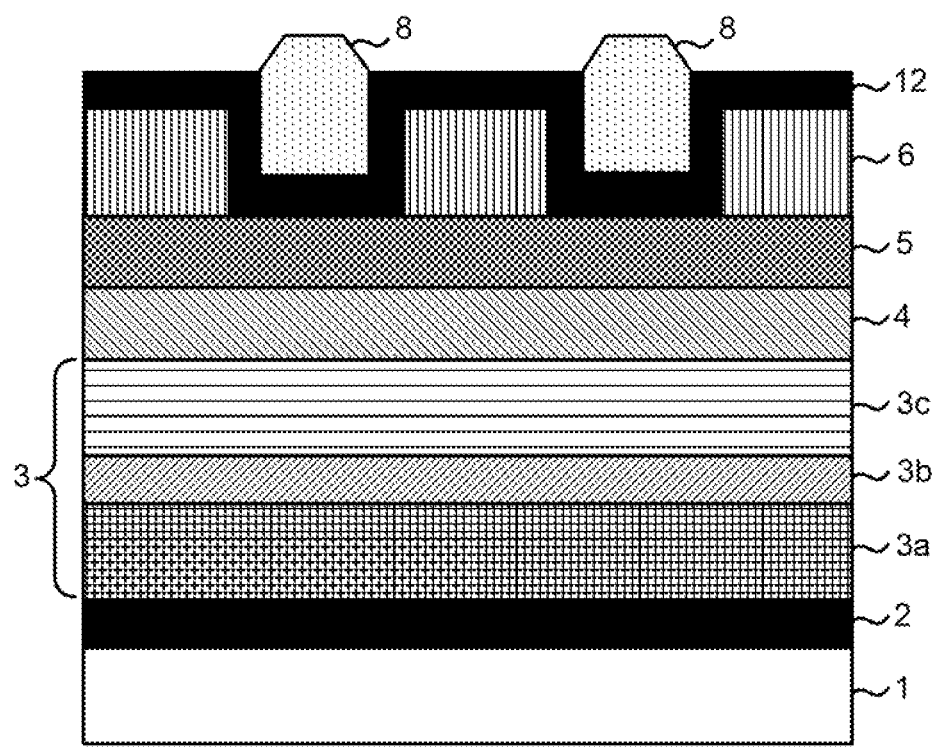
FIG. 13 is a cross-sectional schematic showing a magnetic recording medium after a covering layer has been removed.

As shown in FIG. 13, the covering layer 13 may then be removed using IBE in such a way that the filler layer 8 on the recording regions remains. With dry etching, such as IBE, the projections tend to be selectively etched to a greater extent than the recesses, and the difference in level can be further reduced at the same time when the covering layer 13 is removed in this process. The etching rate of the DLC filler layer 8 may preferably be greater than the etching rate of the covering layer 13. A noble gas such as Ar or a mixed gas comprising Ar and oxygen may be used as the processing gas, or any other suitable gas or gases. The etching rate of the DLC may be greater when it chemically reacts with oxygen gas. On the other hand, a metallic material such as Ti alloy does not chemically react even if it is exposed to oxygen gas, and therefore the etching rate is reduced. The etching rate can therefore be adjusted by using a mixed gas comprising Ar and oxygen as the processing gas, and adjusting the mixing ratio thereof, for example.

Figure 14:
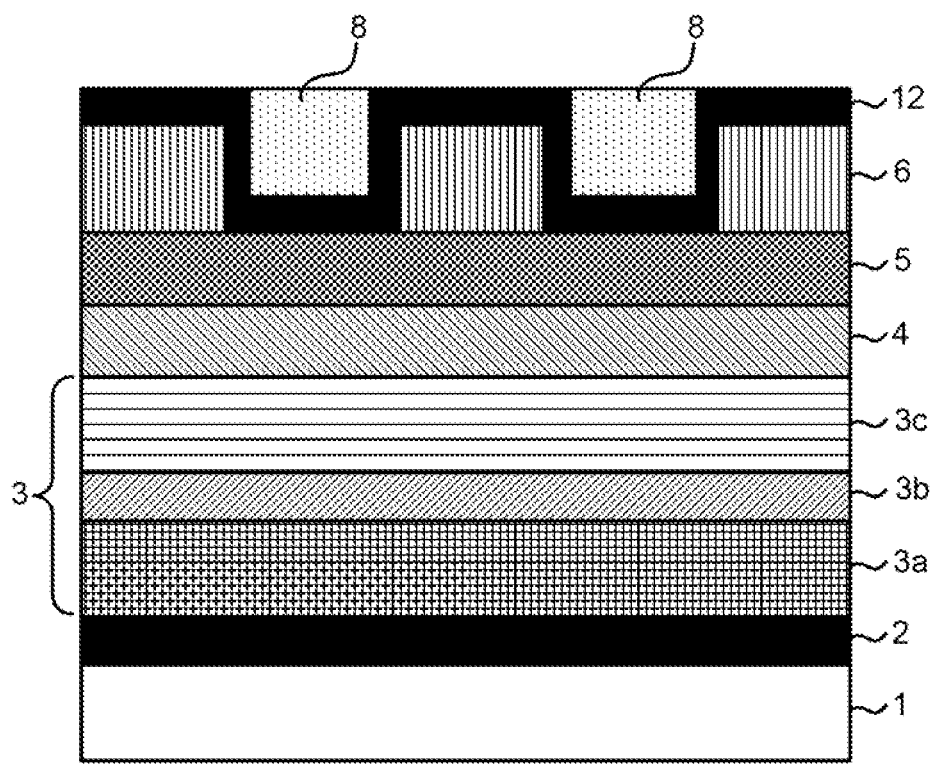
FIG. 14 is a cross-sectional schematic view showing a magnetic recording medium after a filler layer on recording regions has been removed to expose the protective layer on the recording regions.

As shown in FIG. 14, etch-back may then be carried out via RIE or some other method, and the excess filler layer 8 on the recording regions may be completely removed in such a way that the protective layer 12 remains on the top surface of the recording regions. The density of the DLC in the filler layer 8 is lower than that of the carbon material of the protective layer 12, and the DLC etching proceeds more quickly. Since the two etching rates vary in this way, it is possible to reduce the difference in surface to obtain a planar surface. Hydrogen gas, oxygen gas, a mixture of gases comprising hydrogen and oxygen, etc., comprising hydrogen may be used as the processing gas. The protective layer 12 which is already deposited is exposed on the top surface of the recording regions, and therefore this may be used as the protective layer 7 without further processing. The thickness of the protective layer 7 on the top surface of the recording regions which have undergone surface planarization is preferably no more than about 5 nm. The surface of the magnetic recording medium which is produced by the processes up to this stage may have a structure in which the uppermost surface layer of the protective layer 7, which is carbon including relatively fewer hydrogen atoms, and the DLC filler layer 8, which fills the separating regions and is carbon including relatively more hydrogen atoms, are present at intervals in the in-plane direction, according to one embodiment.

A lubricant layer 9 may be formed on the protective layer 7 and filler layer 8 by dipping or some other method. The thickness of the lubricant layer 9 is preferably no more than about 2 nm.

Some of the advantages of the various embodiments described herein include making it possible to achieve a magnetic recording medium having excellent magnetic head flying ability, corrosion resistance, and scratch resistance due to the regions separating the recording regions which are filled with DLC in patterned media typified by discrete track media and bit patterned media which are suitable for a high recording density.

The production of a discrete track medium is described in the following exemplary embodiments, but a bit patterned magnetic recording medium in which all the recording bits are separated from one another may also be produced according to the various embodiments.

In a first exemplary embodiment (Exemplary Embodiment 1), referring again to FIGS. 7-14, the following layers were deposited in succession on a substrate 1 which was a thoroughly washed soda lime glass substrate (outer diameter 65 mm, inner diameter 15 mm, thickness 0.635 mm): an Al-50 at % Ti adhesion layer 2 of 5 nm; an Fe-35 at % Co-9 at % Ta-4 at % Zr alloy lower soft magnetic layer 3a of 20 nm; an Ru alloy anti ferromagnetic coupling layer 3b of 0.5 mu; an Fe-35 at % Co-9 at % Ta-4 at % Zr alloy upper soft magnetic layer 3c of 25 nm; an Ni-8 at % W seed layer 4 of 8 nm; an Ru interlayer 5 of 15 nm; a magnetic recording layer 6 comprising an 18 nm granular magnetic layer formed from 90 mol % (Co-15 at % Cr-18 at % Pt) 8 mol % $SiO_2$ alloy and a 7 nm Co-13 at % Cr-18 at % Pt-7 at % B magnetic layer; and a Ta mask layer precursor 10 of 30 nm. A plate-type sputtering apparatus was used which conveyed the substrate under a vacuum for the formation of each of the above layers, and enabled the above-mentioned plurality of layers to be continuously formed. Alloy targets having the same composition as the desired film composition were prepared, and these were sputtered to form the abovementioned alloy layers.

The Ar gas pressure during film formation was 1 Pa when the layers other than the Ru interlayer 5 and the lower granular magnetic layer of the magnetic recording layer 6 were formed. The Ar gas pressure when the Ru interlayer 5 was formed was 1 Pa for forming the 8 nm lower side of the Ru interlayer 5, and 5 pa for forming the 7 nm upper side. Oxygen was added to the Ar when the granular magnetic layer at the lower side of the magnetic recording layer 6 was formed. The respective partial pressures were 4 Pa in the case of Ar and 0.2 Pa in the case of oxygen.

A methyl methacrylate resin (PMMA) resist layer 11 of 60 nm was then formed on the medium which had undergone the above process, after which a concentric pattern with a resist projection width of 100 nm and a track pitch of 200 nm was formed by nano-imprint technology. This pattern also included a servo area pattern.

The residual resist film in the pattern recesses was then removed using RIE employing oxygen gas, after which a Ta mask layer having the required pattern was formed using RIE employing CF4 gas. The pressure when the resist was removed was 2 Pa, and the pressure when the Ta mask layer was formed was 0.6 Pa.

The magnetic recording layer comprising the 18 nm granular magnetic layer and the 7 nm CoCr-based alloy magnetic layer was then etched using IBE employing Ar gas. The pressure was 0.03 Pa.

The Ta mask layer 102 was then completely removed using RIE employing CF4 gas. The pressure was 0.6 Pa.

An uneven pattern wherein the width of the top surface of the recording regions was 100 nm, the track pitch was 200 nm, and the depth was 25 nm was formed on the magnetic recording layer 6 which had undergone the processes up to this stage.

A DLC protective layer 12 of 8.5 nm was then formed using RF plasma CVD employing acetylene gas. The protective layer 12 was formed as an uneven pattern following the uneven pattern of the magnetic recording layer 6. The RF frequency was 13.56 MHz, the RF power was 800 W, the substrate bias was 300 W, and the pressure was 2 Pa. In this process, the DC voltage (Vdc) effectively applied to the article being processed was 250 V. The hydrogen content of the DLC produced in this process was analyzed by high resolution elastic recoil detection analysis (HR-ERDA). An HRBS 500 produced by Kobe Steel Ltd. was used for the measurements, with beam energy of 240 keV, ion species N2+, scattering angle 30°, beam incident angle 70° with respect to the sample normal direction, sample current of approximately 2 nA, and beam irradiation amount of 300 nC. The hydrogen content of the DLC protective layer 7 was 25 at %.

The DLC filler layer 8 was then formed to 30 nm on the protective layer 12 using RF plasma CVD employing a mixed gas comprising acetylene and hydrogen, and the separating regions were completely filled. The filler layer 8 was also formed as an uneven pattern following the uneven pattern of the magnetic recording layer 6. The RF frequency was 13.56 MHz, the RF power was 800 W, the substrate bias was 100 W, the pressure was 3 Pa, and the flow ratio of hydrogen and ethylene (hydrogen flow rate/acetylene flow rate) was 3.3. In this process, the DC voltage (Vdc) effectively applied to the article being processed was 60 V. The hydrogen content of the DLC filler layer 8 was 33 at %.

A 20 nm Ti-50 at % Cr covering layer 13 was then formed on the DLC filler layer 8 using RF sputtering employing a substrate bias. The RF frequency was 13.56 MHz, the RF power was 800 W, the substrate bias was −40 V, and the pressure was 0.6 Pa. The surface shape after the covering layer 12 had been formed was observed using an atomic force microscope (AFM). The difference in level after the covering layer 13 had been formed was 13 nm, which was less than the 23 nm difference in level after the filler layer 8 had been formed.

The covering layer 13 was then removed using IBE employing a mixed gas comprising Ar and oxygen in such a way that the filler layer B on the recording regions remained. The beam acceleration voltage was 600 V, the pressure was 0.03 Pa, and the flow ratio of Ar and $O_2$ (Ar flow rate/oxygen flow rate) was 2.0. After the covering layer 13 had been removed, the height of the filler layer B on the separating regions was greater than the height of the filler layer B on the recording regions. The difference in level was 1.7 nm.

The excess filler layer B on the recording regions was then removed by etching using RIE employing hydrogen gas, in such a way that the protective layer 12 remained on the top surface of the recording regions. The RF frequency was 13.56 MHz, the RF power was 500 W, and the pressure was 1 Pa. Etch-back using RIE employing hydrogen gas was carried out, after which the height of the top surface of the separating regions was lower than the height of the top surface of the recording regions. The difference in level was 2 nm, and it was possible to obtain a planar surface shape. It should be noted that DLC generally exhibits properties of high density when the hydrogen content thereof is low. The hydrogen content of the DLC in the filler layer B was higher than that of the DLC in the protective layer 12, and the etching rate with RIE employing hydrogen gas was higher than that of the DLC in the protective layer 12. This meant that it was possible to reduce the difference in level between the recording regions and the separating regions. The thickness of the protective layer 12 on the top surface of the recording regions after surface planarization was 3.0 nm, and this was used as the protective layer 7 without further processing.

The PFPE lubricant layer 9 was finally formed on the medium which had undergone the above processes. The thickness was determined using an Fourier transform infrared spectrometer (FT-IR) and found to be 1.0 nm.

According to a second exemplary embodiment (Exemplary Embodiment 2), instead of DLC, ta-C was formed to 5 nm by an filtered cathodic vacuum arc (FCVA) process in the protective layer 12 disclosed in Exemplary Embodiment 1 of a medium which had been patterned using the same process as in Exemplary Embodiment 1. It should be noted that any content which is not disclosed in this exemplary embodiment but which was disclosed in Exemplary Embodiment 1 may be applied in the same way in this exemplary embodiment. The target used was a graphite target and the arc current was 30 A.

After this, the filler layer 8 and covering layer 13 were formed using the same process as in Exemplary Embodiment 1; the covering layer 13 was removed, and the filler layer 8 on the top surface of the recording regions was completely removed in such a way that the protective layer 12 remained at 3.0 nm, after which the height of the top surface of the separating regions was lower than the height of the top surface of the recording regions. The difference in level was 2 nm, and it was possible to obtain a planar surface shape. The residual protective layer 12 was used as the protective layer 7 without further processing. The lubricant layer 9 was finally formed in the same way as in Exemplary Embodiment 1.

According to a third exemplary embodiment (Exemplary Embodiment 3), a protective layer 12 in which, instead of DLC, 1.0 nm of silicon nitride and 7.5 nm of DLC were deposited in succession was formed for the protective layer 12 disclosed in Exemplary Embodiment 1 of a medium which had been patterned using the same process as in Exemplary Embodiment 1. It should be noted that any content which is not disclosed in this exemplary embodiment but which was disclosed in Exemplary Embodiment 1 may be applied in the same way in this exemplary embodiment. The silicon nitride was formed using RF sputtering employing a mixed gas comprising Ar and nitrogen, with the RF power at 500 W, the pressure at 0.5 Pa, and the Ar and nitrogen flow ratio (Ar flow rate/nitrogen flow rate) at 3.5.

After this, the filler layer 8 and covering layer 13 were formed using the same process as in Exemplary Embodiment 1; the covering layer 13 was removed, and the filler layer 8 on the top surface of the recording regions was completely removed in such a way that the protective layer 12 remained at 3.0 nm, after which the height of the top surface of the separating regions was lower than the height of the top surface of the recording regions. The difference in level was 2 nm, and it was possible to obtain a planar surface shape. The residual protective layer 12 was used as the protective layer 7 without further processing. The lubricant layer 9 was finally formed in the same way as in Exemplary Embodiment 1.

According to a fourth exemplary embodiment (Exemplary Embodiment 4), a protective layer 12 in which, instead of DLC, 1.5 nm of silicon carbide and 7.0 nm of DLC were deposited in succession was formed for the protective layer 12 disclosed in Exemplary Embodiment 1 of a medium which had been patterned using the same process as in Exemplary Embodiment 1. It should be noted that any content which is not disclosed in this exemplary embodiment but which was disclosed in Exemplary Embodiment 1 may be applied in the same way in this exemplary embodiment. The silicon nitride was formed using RF sputtering employing Ar gas, with the RF power at 500 W and the pressure at 0.5 Pa.

After this, the filler layer 8 and covering layer 13 were formed using the same process as in Exemplary Embodiment 1; the covering layer 13 was removed, and the filler layer 8 on the top surface of the recording regions was completely removed in such a way that the protective layer 12 remained, after which the height of the top surface of the separating regions was lower than the height of the top surface of the recording regions. The difference in level was 2 nm, and it was possible to obtain a planar surface shape.

The residual protective layer 12 was used as the protective layer 7 without further processing. The lubricant layer 9 was finally formed in the same way as in Exemplary Embodiment 1.

Now some comparative examples are described in order to illustrate differences and advantages of the present invention as recited in Exemplary Embodiments 1, 2, 3, and 4, according to various embodiments.

In a first comparative example (Comparative Example 1) 30 nm of DLC containing 25 at % of hydrogen was formed using CVD on a medium which had been patterned using the same process as in Exemplary Embodiment 1 in order to completely fill the separating regions. Etch-back was then carried out using RIE or IBE, after which 3.0 nm of DLC containing 25 at % of hydrogen, which was the same as the DLC used to fill the separating regions, was formed on the top surface of the recording regions and separating regions, and a protective layer was formed. The results of observation of the surface shape after planarization showed that the height of the top surface of the separating regions was lower than the height of the protective layer on the top surface of the recording regions, and the difference in level was 5 nm. The lubricant layer 9 was formed in the same way as in Exemplary Embodiment 1.

In a second comparative embodiment (Comparative Example 2) 30 nm of DLC containing 33 at % of hydrogen was formed using CVD on a medium which had been patterned using the same process as in Exemplary Embodiment 1 in order to completely fill the separating regions. Etch-back was then carried out using RIE or IBE, after which 3.0 nm of DLC containing 25 at % of hydrogen was formed on the top surface of the recording regions and separating regions, and a protective layer was formed. The height of the top surface of the separating regions was lower than the height of the protective layer on the top surface of the recording regions, and the difference in level was 5 nm. The lubricant layer 9 was formed in the same way as in Exemplary Embodiment 1.

In a third comparative embodiment (Comparative Example 3) the protective layer 12, filler layer 8, and covering layer 13 were formed in the same way as in Exemplary Embodiment 1 on a medium which had been patterned using the same process as in Exemplary Embodiment 1, and the covering layer 13 was removed. The excess filler layer 8 and protective layer 12 were then completely removed in such a way that the height of the top surface of the separating regions was lower than the height of the top surface of the recording regions, and the difference in level was 2 nm. After this, 3.0 nm of a DLC protective layer containing 25 at % of hydrogen was formed by CVD, and the lubricant layer 9 was formed in the same way as in Exemplary Embodiment 1.

Figure 15:
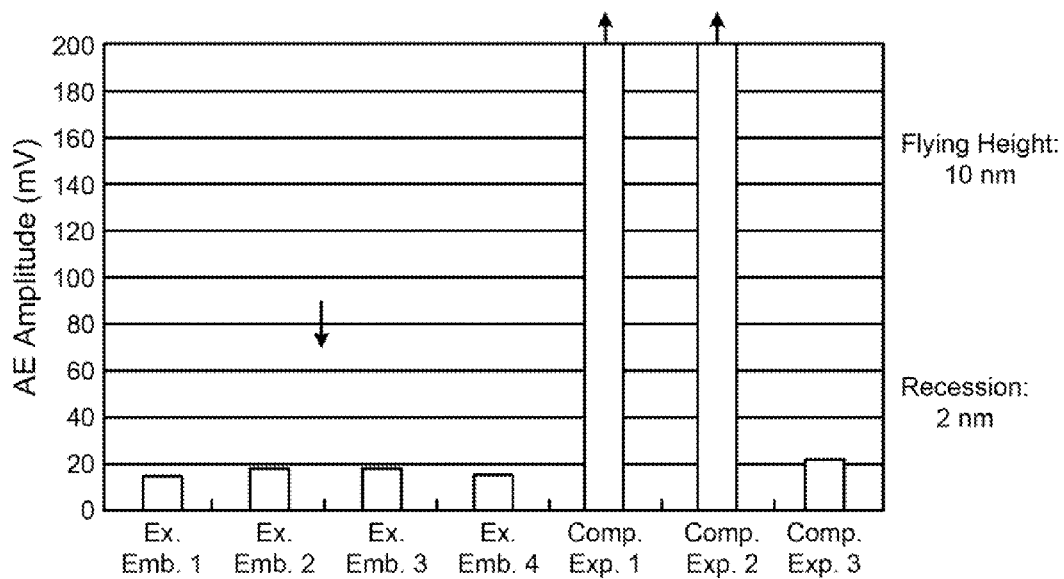
FIG. 15 shows results of magnetic head flying ability testing.

The discrete track media from each of the examples above were evaluated using the following method. First, a magnetic head flying test was carried out. A piezoelectric element was mounted on a magnetic head, and the acoustic emission (AE) signal produced by contact with a magnetic recording medium was detected by the piezoelectric element. The flying height was 10 nm. It was determined that there was contact with the magnetic recording medium when the AE output was 100 mV or more. Furthermore, experiments showed that an AE output of 50 mV or less was the threshold for a stable magnetic head which could carry out reading and writing. The evaluation results are shown in FIG. 15. It is clear from the results in FIG. 15 that the AE output of each of the magnetic recording media in Exemplary Embodiments 1, 2, 3, and 4, and Comparative Example 3 is 50 mV or less, and that the magnetic head flying ability are excellent. It is clear from this that it is possible to obtain a planar surface above which the magnetic head can stably fly by forming a covering layer comprising Ti alloy by sputtering employing substrate bias on a DLC filler layer, as shown in Exemplary Embodiments 1, 2, 3, and 4, and Comparative Example 4.

Figure 16:
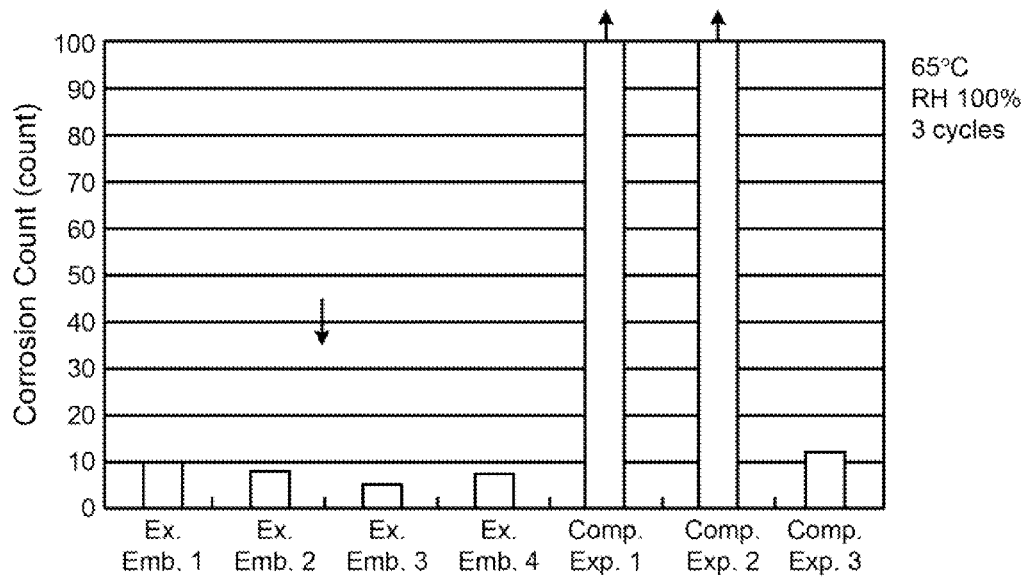
FIG. 16 shows results of corrosion testing on various magnetic heads.

A corrosion resistance test was carried out next under the following conditions. The magnetic recording media were placed for one day inside a temperature-humidity environment tank wherein the temperature was 60° C. and the relative humidity was 100%, and the magnetic disks were removed from the temperature-humidity environment tank after one day (24 hr). Magnetic disks which had undergone three repetitions of this process were taken out and observed using scanning electron microscopy (SEM), and the number of corroded points were counted. A Hitachi S-5500 was used for the measurements, the emission current was 10 uA, and the acceleration voltage was 2 kv. The observations were carried out after a Pt coating of around 1-2 nm had been applied to the sample surfaces. This experiment showed that it was possible to obtain sufficient corrosion resistance for a magnetic recording medium for use in a hard disk drive when the number of corroded points was 50 or less. The evaluation results are shown in FIG. 16. The results in FIG. 16 show that the magnetic recording media from Exemplary Embodiments 1, 2, 3, and 4 demonstrate good corrosion resistance. Peeling and cracks were observed in the magnetic recording medium from Comparative Example 1. This is believed to be because the high hardness DLC film used as the protective layer in the magnetic recording medium was formed too thick.

A crash evaluation was carried out next in order to assess the scratch resistance. A magnetic head was made to seek from the inner periphery of a magnetic disk to the outer periphery at 1 Hz, and seeking was repeated from the outer periphery to the inner periphery, and from the inner periphery to the outer periphery. In this test, the test area in the radial direction was 2 nm, the rotational speed of the magnetic recording medium was 5400 rpm, and the test was carried out with the magnetic head in contact with the medium rather than flying. The time at which the magnetic disk device could no longer reproduce data recorded on the magnetic recording medium was found in this test, and this was defined as the crash time of the device.

Figure 17:
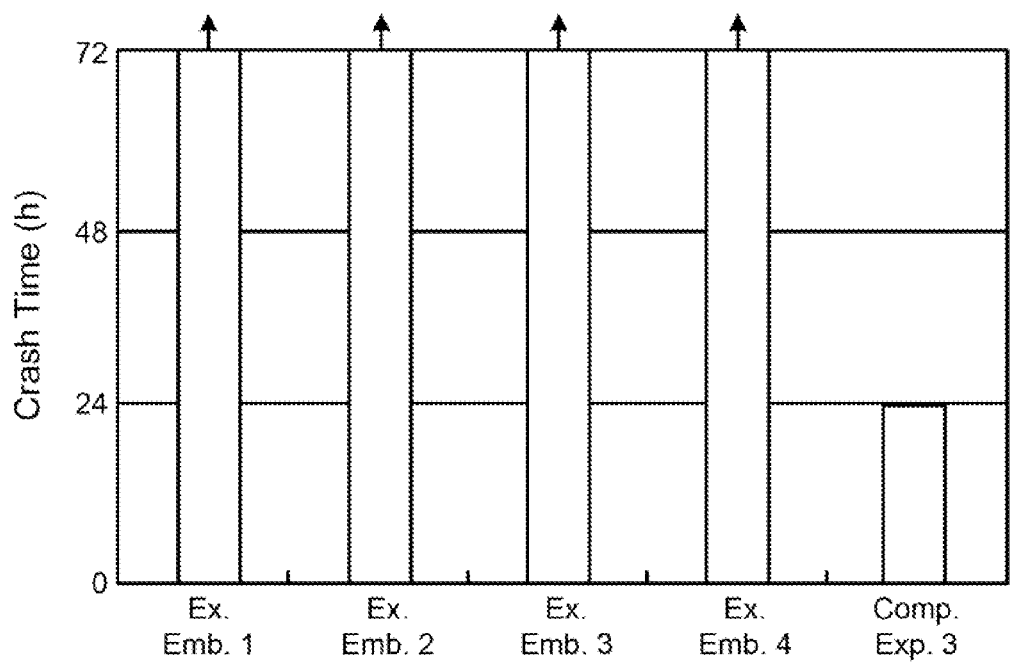
FIG. 17 shows results of a crash test on various magnetic heads.

It should be noted that this test was carried out using a magnetic disk device on which were mounted the magnetic recording media from Exemplary Embodiments 1, 2, 3, and 4 and from Comparative Example 3, which had stable magnetic head flying ability. The evaluation results are shown in FIG. 17. It is clear from the results in FIG. 17 that the magnetic recording medium from Comparative Example 3 crashed in 24 hours, whereas the magnetic recording media from Exemplary Embodiments 1, 2, 3, and 4 had still not crashed after 72 hours. It is clear from this that the magnetic recording media from Exemplary Embodiments 1, 2, 3, and 4 had better crash resistance than the comparative examples.

The surface of the magnetic recording media before the lubricant layer was formed in each exemplary embodiment had a structure in which the protective layer, which was carbon material containing relatively less hydrogen, and the DLC filler layer, which contained relatively more hydrogen, were present at intervals in the in-plane direction, and lubricant was coated thereon. By means of this, the carbon forming the protective layer 7 on the top surface of the recording regions and having less hydrogen in the carbon have high affinity for the polar group in the lubricant, and the lubricant on the top surface of the recording regions was not scattered by the rotation. In contrast to this, the carbon filling the separating regions and having more hydrogen in the carbon low affinity for the polar group in the lubricant, and therefore there was an effect whereby the capacity for reducing the shear force caused by contact, which is the intrinsic function of the lubricant, could be demonstrated to the maximum. By adopting this kind of structure in which the portion having relatively less hydrogen in the carbon material and the portion having relatively more hydrogen were present at intervals in the in-plane direction, the lubricant coated on the separating regions was more likely to be scattered, but the lubricant coated on the protective layer on the top surface of the adjacent recording regions have high affinity for the protective layer and was not readily scattered, and therefore the lubricant having low affinity which was coated on the separating regions was not readily scattered either, and the lubricant having low affinity which was coated on the separating regions reduced the shear force caused by contact, and even if the lubricant which have high affinity on the surface of the protective layer was damaged by contact with the magnetic head, the lubricant having low affinity which was coated on the adjacent separating regions covered the exposed portions of the protective layer, and as a result it was possible to obtain a magnetic recording medium having very good scratch resistance.

The various embodiments described above describe how it is possible to provide a magnetic recording medium in which the separating regions which separate the recording regions are filled with DLC, while the magnetic recording medium has excellent magnetic head flying ability, corrosion resistance, and scratch resistance, and also to provide a method for producing the same.

It should be noted that methodology presented herein for at least some of the various embodiments may be implemented, in whole or in part, in computer hardware, software, by hand, using specialty equipment, etc., and combinations thereof.

Also, any of these embodiments may be implemented in a magnetic data storage system such as a disk drive system, which may include a magnetic head, a slider for supporting the head, a drive mechanism for passing a magnetic medium (e.g., hard disk) over the head, and a control unit electrically coupled to the head for controlling operation of the head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for forming a magnetic recording medium, the method comprising:
   forming an adhesion layer above a substrate;
   forming a lower soft magnetic layer above the adhesion layer;
   forming an antiferromagnetic coupling layer above the lower soft magnetic layer;
   forming an upper soft magnetic layer above the antiferromagnetic coupling layer;
   forming a seed layer above the upper soft magnetic layer;
   forming an interlayer above the seed layer and below a patterned magnetic recording layer;
   forming a protective layer above recording regions of the patterned magnetic recording layer and separating regions between the recording regions, wherein the recording regions comprise a magnetic material, and wherein the protective layer forms on sides of the recording regions between the recording regions and the separating regions and partially fills the separating regions; and
   forming a filler layer on the protective layer, wherein the filler layer completely fills the separating regions, and wherein the filler layer has an uneven upper surface.

2. The method as recited in claim 1, further comprising planarizing the filler layer.

3. The method as recited in claim 1, further comprising forming the patterned magnetic recording layer.

4. The method as recited in claim 3, further comprising:
   forming a covering layer on the filler layer; and
   planarizing the covering layer and the filler layer,
   wherein the covering layer has an upper surface which is less uneven than the upper surface of the filler layer.

5. The method as recited in claim 4, further comprising removing the covering layer such that the filler layer remains and vertical projections of the upper surface of the filler layer are reduced.

6. The method as recited in claim 5, wherein the removing comprises ion beam etching.

7. The method as recited in claim 1, wherein the filler layer and the protective layer comprise diamond like carbon (DLC), wherein a density of DLC in the filler layer is lower than a density of DLC in the protective layer.

8. The method as recited in claim 7, further comprising etching-back portions of the filler layer positioned above the patterned magnetic recording layer such that the protective layer remains above the patterned magnetic recording layer due to etching of the filler layer proceeding more quickly than etching of the protective layer and this protective layer is used as the protective layer without further processing.

9. The method as recited in claim 1, wherein forming the patterned magnetic recording layer comprises:
   forming a resist layer above a magnetic recording layer;
   imprinting a desired pattern to the resist layer;
   forming a mask layer having the desired pattern above exposed portions of the magnetic recording layer and the resist layer;
   imparting the desired pattern onto the magnetic recording layer; and
   removing the mask layer and the resist layer.

10. The method as recited in claim 1, wherein the magnetic recording medium is a bit patterned medium.

11. The method as recited in claim 1, wherein the magnetic recording medium is a discrete track medium.

12. A magnetic recording medium, comprising:
   a patterned magnetic recording layer;
   a protective layer above the patterned magnetic recording layer and on sides of the patterned magnetic recording layer; and
   a filler layer positioned between the patterned magnetic recording layer in separating regions,
   wherein an uppermost layer of the protective layer comprises carbon and hydrogen,
   wherein the filler layer and the protective layer comprise diamond like carbon (DLC),
   wherein the uppermost layer of the protective layer includes less hydrogen atoms per volume than the filler layer, and
   wherein a density of DLC in the filler layer is lower than a density of DLC in the protective layer.

13. The magnetic recording medium as recited in claim 12, wherein the filler layer and the protective layer are planarized.

14. The magnetic recording medium as recited in claim 12, wherein the filler layer has a characteristic of having been planarized while having a covering layer thereon.

15. The magnetic recording medium as recited in claim 12, further comprising:
   an adhesion layer;
   a lower soft magnetic layer above the adhesion layer;
   an antiferromagnetic coupling layer above the lower soft magnetic layer;
   an upper soft magnetic layer above the antiferromagnetic coupling layer;
   a seed layer above the upper soft magnetic layer; and
   an interlayer above the seed layer,
   wherein the patterned magnetic recording layer is above the interlayer.

16. The magnetic recording medium as recited in claim 12, wherein the magnetic recording medium is a bit patterned medium.

17. The magnetic recording medium as recited in claim 12, wherein the magnetic recording medium is a discrete track medium.

18. The magnetic recording medium as recited in claim 12, wherein the magnetic recording layer and the filler layer are present in intervals at a surface of the magnetic recording medium.

19. A magnetic data storage system, comprising:
   at least one magnetic head;
   a magnetic recording medium as recited in claim 12;
   a drive mechanism for passing the magnetic medium over the at least one magnetic head; and
   a controller electrically coupled to the at least one magnetic head for controlling operation of the at least one magnetic head.

20. A magnetic recording medium, comprising:
   a soft magnetic layer above a substrate, the soft magnetic layer comprising:
      a lower soft magnetic layer above an adhesion layer;
      an antiferromagnetic coupling layer above the lower soft magnetic layer; and
      an upper soft magnetic layer above the antiferromagnetic coupling layer;
   a seed layer above the soft magnetic layer;
   an interlayer above the seed layer;
   a patterned magnetic recording layer above the interlayer, the patterned magnetic recording layer comprising recording regions and separating regions between the recording regions, wherein the recording regions comprise a magnetic material;
   a protective layer above the recording regions and the separating regions of the patterned magnetic recording layer, wherein the protective layer is on sides of the recording regions and partially fills the separating regions; and
   a filler layer on portions of the protective layer in the separating regions, wherein the filler layer fills a remaining portion of the separating regions.

21. The magnetic recording medium as recited in claim 20, wherein the filler layer and the protective layer comprise diamond like carbon (DLC), and wherein a density of DLC in the filler layer is lower than a density of DLC in the protective layer.

* * * * *

UNITED STATES PATENT AND TRADEMARK OFFICE
CERTIFICATE OF CORRECTION

PATENT NO.         : 8,767,350 B2                                    Page 1 of 1
APPLICATION NO.    : 12/961430
DATED              : July 1, 2014
INVENTOR(S)        : Yakushiji et al.

It is certified that error appears in the above-identified patent and that said Letters Patent is hereby corrected as shown below:

In the specification:

col. 8, line 66 replace "AlTi" with --AlTi--;

col. 12, line 53 replace "mu;" with --nm;--.

Signed and Sealed this
Fourteenth Day of October, 2014

Michelle K. Lee
*Deputy Director of the United States Patent and Trademark Office*